(12) United States Patent
Schaffrinski et al.

(10) Patent No.: US 12,371,270 B2
(45) Date of Patent: Jul. 29, 2025

(54) RAIL-TYPE FLOOR CONVEYOR SYSTEM AND METHOD FOR OPERATING A RAIL-TYPE FLOOR CONVEYOR SYSTEM

(71) Applicant: Strothmann Machines & Handling GmbH, Schloss Holte-Stukenbrock (DE)

(72) Inventors: Dominik Schaffrinski, Detmold (DE); Stefan Rehling, Bückeburg (DE); Tim Büllesbach, Werther (DE); Markus Ostendorf, Paderborn (DE); Juri Rempel, Verl (DE); Tobias Schartner, Rheda-Wiedenbrück (DE); Alexandr Götting, Bielefeld (DE); Fabian Kuhlemann, Schlangen (DE); Michael Bentrup, Steinhagen (DE)

(73) Assignee: Strothmann Machines & Handling GmbH, Schloss Holte-Stukenbrock (DE)

( * ) Notice: Subject to any disclaimer, the term of this patent is extended or adjusted under 35 U.S.C. 154(b) by 0 days.

(21) Appl. No.: 18/569,374

(22) PCT Filed: Sep. 30, 2022

(86) PCT No.: PCT/EP2022/077284
§ 371 (c)(1),
(2) Date: Dec. 12, 2023

(87) PCT Pub. No.: WO2023/072527
PCT Pub. Date: May 4, 2023

(65) Prior Publication Data
US 2024/0278997 A1 Aug. 22, 2024

(30) Foreign Application Priority Data
Oct. 27, 2021 (DE) .......................... 102021005342.7

(51) Int. Cl.
*B65G 35/06* (2006.01)
(52) U.S. Cl.
CPC .................................... *B65G 35/06* (2013.01)
(58) Field of Classification Search
None
See application file for complete search history.

(56) References Cited

U.S. PATENT DOCUMENTS 3,976,330 A * 8/1976 Babinski ........... H01L 21/67784
406/87
5,495,809 A * 3/1996 Carbo ..................... B65G 7/04
105/220

(Continued)

FOREIGN PATENT DOCUMENTS

DE            4318383 C1      7/1974
DE      102016005635 A1     11/2017

(Continued)

*Primary Examiner* — Kavel Singh
(74) *Attorney, Agent, or Firm* — Richard M. Goldberg (57) ABSTRACT

A rail-type floor conveyor system includes at least two rail pairs of different running directions, at least four rotatably mounted support plates on bearings, located in the intersection region of the rail pairs and on which wheels of a floor conveyor are rotated from a first into a second running direction, at least one floor conveyor having at least four wheel cassettes, rotated about a vertical axis and each have at least one wheel in contact with the rails, and wherein each wheel has a peripheral contour complementary to at least one profile of a rail so that transverse forces on the floor conveyor are absorbed by the rail pair, and a wheel-cassette rotary drive assembly connected to the floor conveyor and able to rotate the wheel cassettes about their vertical axis on the support plates, wherein no profiling for guiding the wheels is on the support plates.

17 Claims, 7 Drawing Sheets

(56) References Cited

U.S. PATENT DOCUMENTS

| | | | | |
|---|---|---|---|---|
| 5,857,413 A * | 1/1999 | Ward | ............... | B23Q 7/1436 |
| | | | | 104/301 |
| 6,308,818 B1 * | 10/2001 | Bonora | ............ | B65G 37/02 |
| | | | | 198/465.1 |
| 6,907,983 B2 * | 6/2005 | Freudelsperger | ...... | B65G 47/80 |
| | | | | 198/463.3 |
| 7,801,641 B2 * | 9/2010 | Yoshikawa | ...... | G05B 19/41895 |
| | | | | 414/935 |
| 2016/0300291 A1 * | 10/2016 | Carmeli | ......... | G06Q 30/0635 |

FOREIGN PATENT DOCUMENTS

| | | | |
|---|---|---|---|
| DE | 102017001349 | A1 | 8/2018 |
| EP | 0001638 | A1 | 5/1979 |
| EP | 0184218 | A2 | 11/1986 |
| GB | 1272263 | A | 4/1972 |
| WO | 2014032699 | A1 | 3/2014 |

* cited by examiner

RAIL-TYPE FLOOR CONVEYOR SYSTEM AND METHOD FOR OPERATING A RAIL-TYPE FLOOR CONVEYOR SYSTEM

BACKGROUND OF THE INVENTION

The invention relates to a rail-type floor conveyor system for floor conveyors comprising at least two rail pairs, of different running directions, which run towards each other, and at least four rotatably mounted support plates on bearings, which are located in the intersection region of the first and second rail pairs and on which wheels of a floor conveyor can be pivoted or rotated from a first into a second running direction, and at least one floor conveyor having at least four wheel cassettes, which can be rotated about a vertical axis and which each have at least one wheel in contact with the rails, wherein
 the wheel has a peripheral contour which is complementary to at least one profile of a rail of a rail pair, so that transverse forces on the floor conveyor can also be absorbed by the rail pair, and wherein
 a wheel-cassette rotary drive assembly is provided, which is connected to the floor conveyor, and is able to rotate the wheel cassettes about their vertical axis on the support plates.

The invention further relates to a method for operating a said rail-type floor conveyor system during a direction change of a floor conveyor from a first rail pair to an intersecting second rail pair with the aid of the rotation of wheel cassettes, which are mounted on the floor conveyor on bearings about an axis of rotation, by means of a wheel-cassette rotary drive assembly.

The rails (pairs) referred to here are primarily, but not limitedly, the rails according to DE 43 18 383 C1 or WO 2014/032699 A1 distributed by the applicant. This type of round rail has proven itself in practice because they are simple in design and therefore easy to manufacture. A rail-type floor conveyor with concave wheel contact surfaces can moreover be reliably guided over the round profile. Another advantage for production halls is that the rail can be laid almost flush with the floor, so that other vehicles are not restricted in their freedom of movement. The risk of soiling the rails is significantly reduced in contrast to U-shaped rails wherein the wheels of the floor conveyor run inside.

As a rule, a floor conveyor is guided on two parallel rails and the invention is elucidated in this state. More than two parallel rails should, however, also be covered by the invention if, for example, the load of the floor conveyor becomes too great or the distance between the wheels is too great.

Various switch systems are known from DE 10 2017 001 349 A1 of the applicant. For example, there are support plates on which a floor conveyor stands with all its wheels and which can be rotated in a direction leading further onwards. There are also known switches going by the name "quadro turnstiles". These are smaller support plates mounted on bearings with cross-shaped recessed guides for the wheels of the floor conveyor. The diameter of the support plates is large enough to accommodate one wheel or a shorter set of 2-3 wheels which are to be rotated together. For the intended direction change of the floor conveyor, only the wheels are therefore rotated about a vertical axis and transferred onwards to the crossing rails. In this way, the floor conveyor is moved along transversely to its original direction of travel. These switches can be self-propelled or passive and only turn when the rotation of the conveyance wheels is initiated.

In the latter case, each support plate is usually either equipped with an intersecting rail profile so that the wheels of the floor conveyor roll seamlessly from the rails onto the support plates. The rail profile on the support plates can, for example, be the continuation of the round rail used in the production hall, or be a groove into which the wheel width precisely fits and which guides the wheel laterally. When the wheels or the wheel cassettes of the floor conveyor rotate from the first running direction to the second running direction with the help of a wheel-cassette rotary drive assembly on the floor conveyor itself, the support plates are also rotated synchronously by means of the lateral stabilization of the wheels.

This principle usually works very well, however a precise positioning of the support plates in space and in relation to each other is essential for the function. A problem that occurs from time to time is that the support plates are twisted by external influences, for example, by being driven over by a forklift truck, to such an extent that the wheels can no longer run exactly onto the rail profile on the support plates. This can lead to the direction change of the floor conveyor being unsuccessful.

SUMMARY OF THE INVENTION

It is therefore the task of the invention to make a direction change of a floor conveyor in a rail-type floor conveyor system more functionally reliable.

The task is solved with regard to the rail-type floor conveyor system by the features of the claims and in particular by the fact that no profiling suitable for guiding the wheels is provided on the support plates.

Surprisingly, it has been shown that a rail profile is not necessary on the support plates, in order to reliably rotate the support plates with the rotation of a wheel cassette. The inventors have recognized in extensive tests that the static friction between the wheels and the surface of the support plates may well be sufficient to synchronously rotate the support plates when the wheels or alternatively wheel cassettes change direction. In particular, if wheel cassettes are provided that have at least two wheels and the vertical axis of rotation of the cassette lies precisely between the two wheels, a "synchronous rotation" of the support plate is ensured upon rotation of the wheel cassette with the exemplary static friction of a simple steel-on-steel pairing of the wheel circumference surface and the support plate surface. Coming from the rail profile in the production hall, which profile ensures lateral guidance of the wheels of the floor conveyor, on the short transport route in a running direction, while travelling alone on the support plate, such a guide can be dispensed with without causing any problems.

In a particularly preferred embodiment, the support plate even has a flat surface.

This completely prevents unintentional rotation of a support plate due to external influences from having a negative effect on the direction change of the wheels.

It is favorable if there is a coefficient of friction for static friction of more than 0.07, particularly preferably more than 0.13, between the outer circumference and the surface of the support plate.

Starting from the material pairing and the known weight of the floor conveyor, it is easy to calculate the minimum value of the coefficient of friction at hand. With a coefficient of friction in the order of magnitude mentioned, lateral slippage of the wheels during rotation to change direction on the support plates can be ruled out. If necessary, the coefficient of friction can be positively influenced by coatings with higher friction or by surface treatment.

Preferably, the rail-type floor conveyor system comprises at least one sensor for detecting the position of a floor conveyor in the intersection region or of a wheel on a support plate.

Such a sensor can, for example, carry out optical or inductive measurements. Preferably, a monitoring of all wheels takes place so that it is ensured that all wheels are on support plates before a direction change is initiated.

It is advantageously provided that a motor of the wheel-cassette rotary drive assembly can only be activated when at least one detecting device coupled to the sensor has transmitted a signal to a control unit.

This precludes malfunctions with regard to a direction change of the floor conveyor without the wheels standing on a support plate.

Preferably, at least two wheel cassettes can be rotated or pivoted synchronously by means of the wheel-cassette rotary drive assembly.

If two or even all wheel cassettes are simultaneously rotatable, the direction change is executed particularly quickly. The wheel-cassette rotary drive assembly can, moreover, be constructed more simply and requires fewer motors than if each wheel cassette has its own individual rotary drive. This possibility with individual drives should, however, also be covered by the invention.

A drive connected to a motor is suitable, which drive can synchronously execute the rotation of the wheel cassettes from one running direction to another running direction, this for at least two wheel cassettes, and if necessary even for all wheel cassettes. By way of example, worm drives, rack and pinion drives, coupling drives or drives with traction or pressure means can be used here.

Tests have shown that a drive with a traction or pressure element which is movable by a motor and is connected to a lever on the wheel cassette is particularly effective. This gives the floor conveyor a relatively simple yet functional construction. Pneumatic actuating cylinders or electric motors with a toothed or threaded rod drive are particularly suitable as motors. The rotation of the wheel cassette can then be rotated in a simple way analogous to a push crank.

The floor conveyor, preferably, has a traction drive arrangement acting on at least one wheel of a wheel cassette.

In this context, at least one wheel per rail should be driven. This not only has the advantage that the floor conveyor can be moved independently without manual intervention, but rather that the wheels of the floor conveyor can also be precisely aligned on the turntables.

In this context, it is advantageous if all the wheels of a wheel cassette can be driven in the same way, which is to say, that the driving force can be synchronized by means of the rotation of all the wheels of a wheel cassette.

In the present invention, such a coupling is most easily achieved by means of a toothed belt or V-belt connecting the wheel axles. Geared connections or the like are, however, also conceivable within the scope of the invention.

It is advantageous if the rotation of the wheel cassettes can be performed by means of the wheel-cassette rotary drive assembly on the floor conveyor and it can therefore be supplied with energy by means of a rechargeable energy storage unit. The same may also apply to a possible energy supply of a traction drive of the floor conveyor.

In this case, sliding contacts or the like are not used to supply energy to the drive arrangements and the currently feasible method of rechargeable energy storage unit is chosen. As a rule, these are modern accumulators, which are preferably rechargeable.

This can preferably occur when the floor conveyor is at a charging station or by means of inductive charging along the travel path when the floor conveyor is moving.

As regards the method for operating a rail-type floor conveyor system according to any one of the claims for the rail-type floor conveyor system during a direction change of a floor conveyor, the task is solved in that at least one support plate, which is unprofiled on its surface, is synchronously rotated by the static friction of a wheel due to the rotation of the wheel cassette about a vertical axis.

In this case, the initial position of the support plate is irrelevant. Before the floor conveyor gets driven on the support plate, it may therefore have been adjusted several times relative to other support plates without the negative effects of the prior art coming into play.

It is particularly preferable, if as a pairing between the outer circumference of the wheel and the surface of the support plate, a coefficient of friction for static friction of more than 0.07 and particularly preferably more than 0.13 is provided.

This minimum value is to be regarded as sufficient with regard to functional reliability. In this case, functional reliability means that there is only insignificant or no sliding friction between the wheel and the support plates, so that there is no significant abrasion either on the wheel or on the surface of the support plate. In this context, each wheel coming from a rail on the support plates must be able to be transferred to the intersecting rail.

Advantageously, a traction drive arrangement connected to the floor conveyor acts on at least one wheel of a wheel cassette to move the floor conveyor into and away from the intersection region.

The floor conveyor therefore has its own traction drive that can drive it on the rails, if possible with its own power supply. It precisely drives the floor conveyor with its wheel cassettes onto the support plates, as already described with regard to the system, so that the axes of rotation of the wheel cassette and support plates are aligned, and stops there. Following the rotation of the wheels in the direction of the intersecting rail pair, this traction drive can once again drive the floor conveyor.

BRIEF DESCRIPTION OF THE DRAWINGS

The invention is elucidated below on the basis of the illustrative drawings. The figures, most of which are three-dimensional, show FIG. 1 an intersection region of the rail system for a rail-type floor conveyor with rotatable support plates, FIG. 2 a detailed view of an intersection region in which only the wheel cassettes and the wheel-cassette rotary drive assemblies of a floor conveyor are represented, FIG. 3 a top view of an uncovered floor conveyor in an intersection region, FIG. 4 a top view of an almost fully covered floor conveyor in an intersection region with opened energy storage unit and control unit slide-in slot, FIG. 5 a floor conveyor from below, FIG. 6a-d the process of rotation of the wheel cassettes in four different rotational angle positions, and FIG. 7 a schematic representation in top view of a floor conveyor in a charging station.

DETAILED DESCRIPTION

All figures substantially refer to one single embodiment of the rail-type floor conveyor system. In this respect, all wheel cassettes 8 of the floor conveyor 6 shown or their detailed views are respectively equipped with two wheels 7. In principle, the invention should, however, also comprise wheel cassettes with more or fewer wheels.

Figure 1:
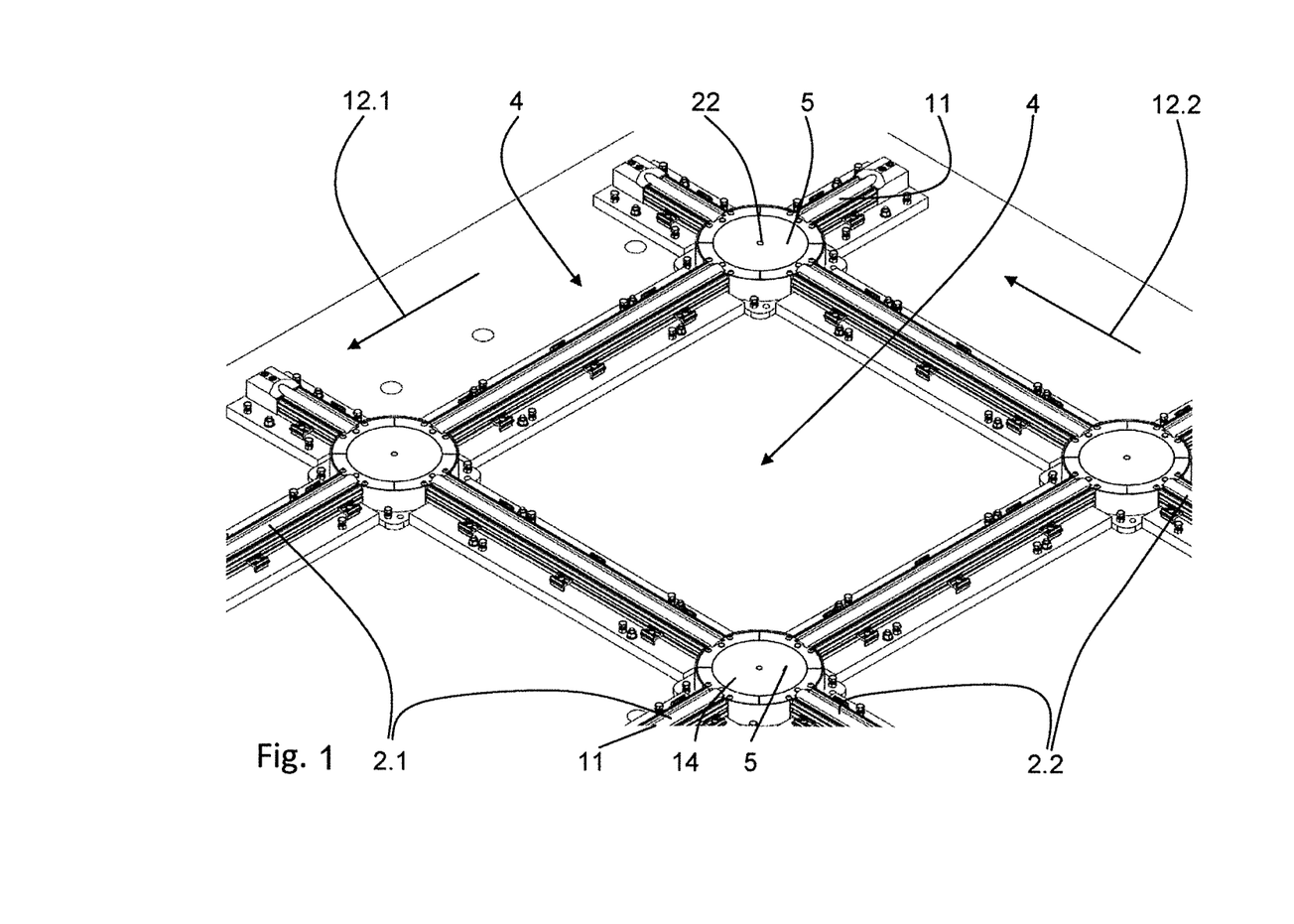

FIG. 1 shows the basis of the invention of a rail-type floor conveyor system, namely a first rail pair 2.1 and a second rail pair 2.2 intersecting the first, which can be moved by motor or manually on the floor conveyor 6. For better visualization, the production hall floor 15 to the side of the rails is not shown. The surface of the production hall floor is approximately at the level of the upper edge of the rails or support plates. By way of example, two running directions 12.1 and 12.2 are indicated by arrows. The wheels of a floor conveyor must be oriented in these running directions. In this context, the rotation takes place on the rotatable support plates 5 shown in FIG. 1, which, according to the invention, are not provided with a guide contour for the wheels, but rather whose rotation takes place merely by means of the friction of the wheels when they are twisted by the motor in the respective running direction. In this manner it is prevented that a support plate that is unintentionally rotated by bumping against a guide contour for the wheels can hinder the change in wheel position in the second running direction. Only recent attempts by the inventors, wherein no contour is installed on the support plates to guide the wheels, have shown that such "rails" on the support plates can unexpectedly be dispensed with. In this context, an unintentional twisting of the support plates is largely prevented inasmuch as they preferably have an absolutely smooth and flat surface 14.

Figure 2:
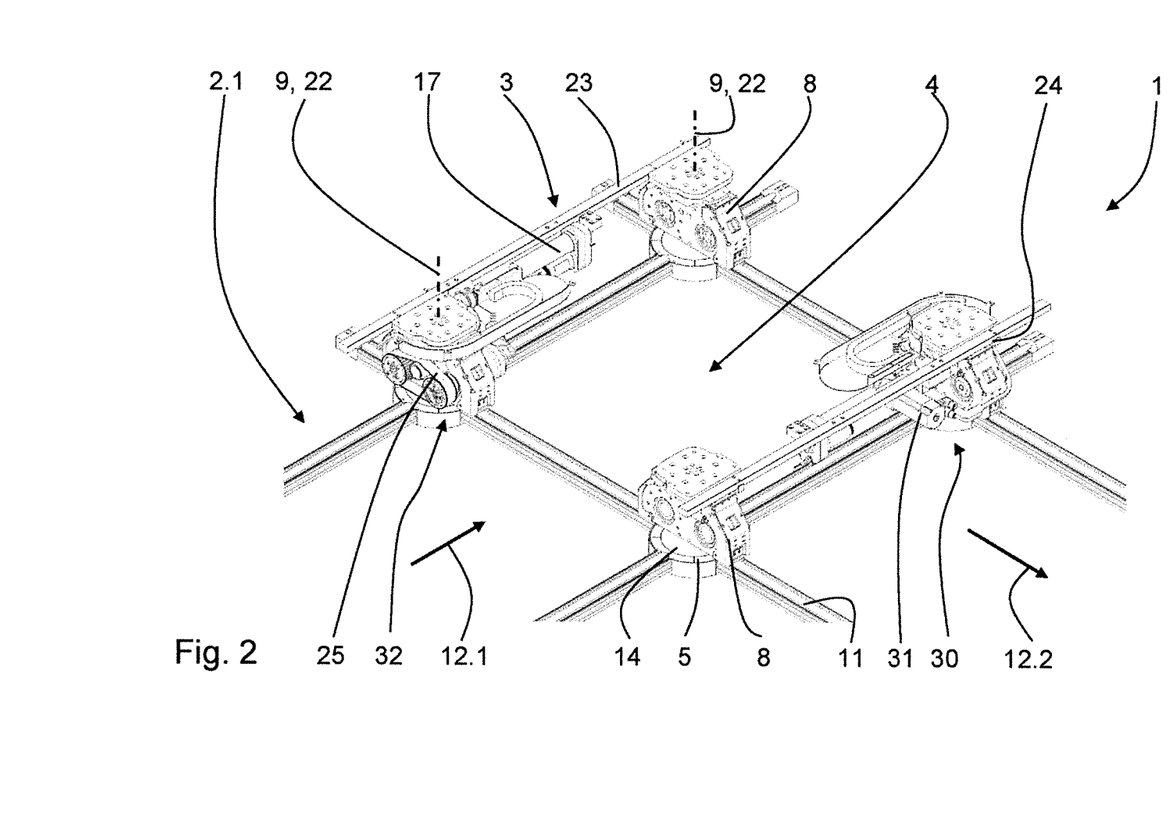

FIG. 2 shows how, respectively, two wheels 7 of a wheel cassette 8 of a floor conveyor 6 stand on a rotatable support plate 5 mounted on bearings, which is first shown in the following figures. The axis of rotation 9 of the wheel cassette 8 is aligned with the axis of rotation 22 of the support plate.

In each case, two wheel cassettes 8 can be rotated together about their axes of rotation 9. For this purpose, a push rod 23 engages a lever 24 on both wheel cassettes, which push rod is linearly displaceable by means of a motor 17 of this wheel-cassette rotary drive assembly 3. In this embodiment example, the motor 17 is an electric motor with a linear drive, but could theoretically also be a pneumatic cylinder if a compressed air supply can be provided. Due to the longitudinal displacement of the push rod 23, the wheel cassettes can be rotated by up to 120°.

Figure 6:
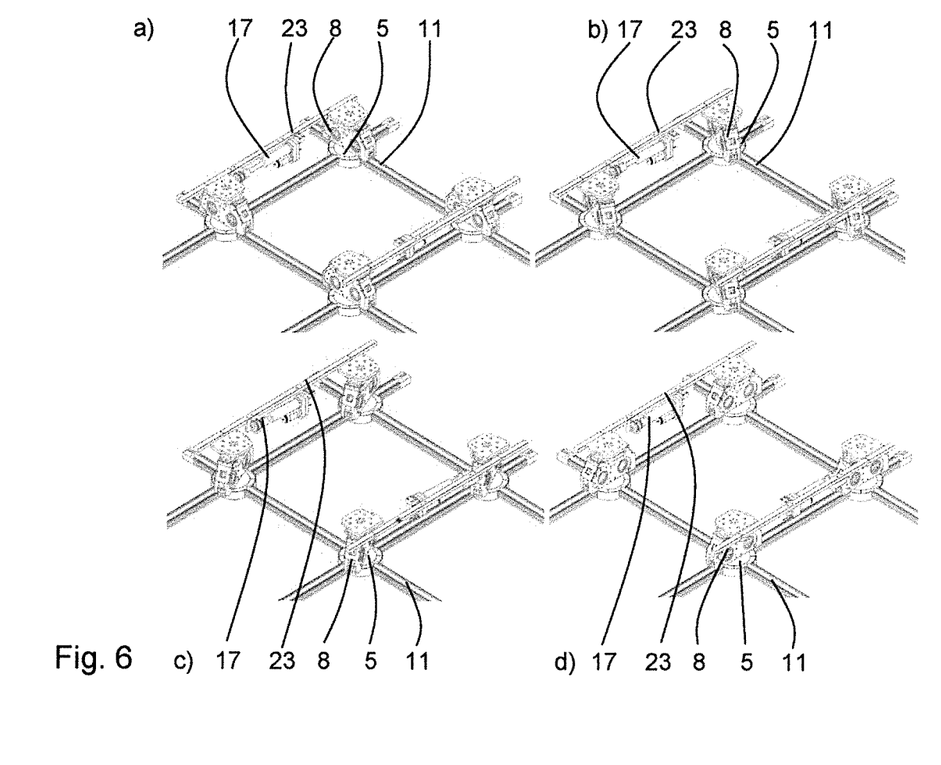

In FIG. 6, the process of rotation of the wheel cassettes 8 by means of motor 17 and push rod 23 is illustrated in more detail in four successive time intervals a)-d).

FIG. 2 also shows the traction drive arrangement 30 for the floor conveyor 6. It is configured in such a way that at least one wheel cassette is always provided on both rails, in which wheel cassette at least one wheel can be driven by a motor 31. A synchronization unit 32 is also provided in order to drive both wheels of the cassette synchronously. This synchronization unit is, for example, simply implemented by means of a toothed belt 25 that connects the shafts of the wheels 7.

Figure 3:
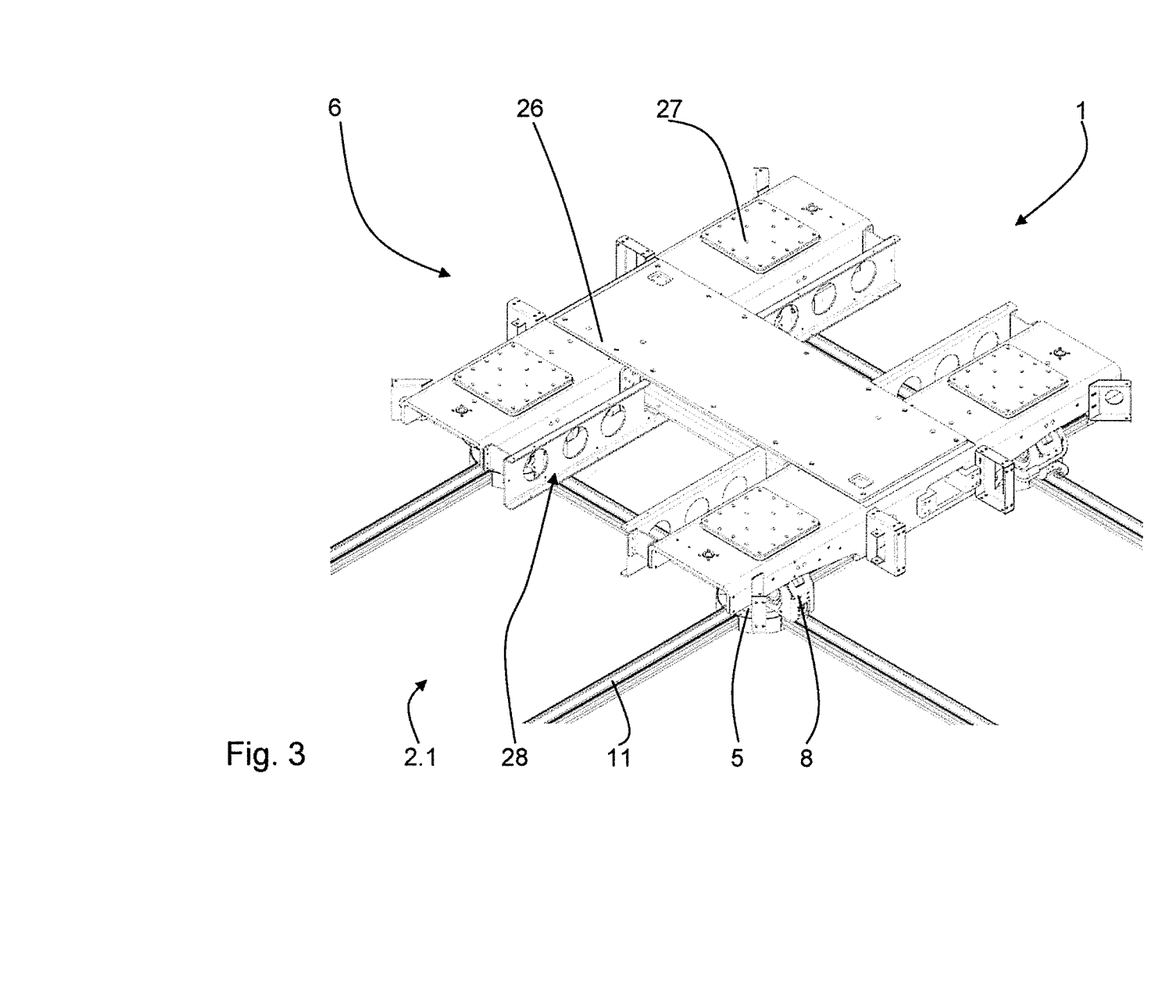

FIG. 3 shows the arrangement of the rail-type floor conveyor system 1 from FIG. 2 with the addition of the chassis 26 of the floor conveyor 6. The reinforced bearing surfaces 27 for the goods to be transported are also provided. Integrated slide-in slots 28, which are intended for electronic components and energy storage unit, are also visible.

FIG. 4 shows the once again supplemented arrangement. The chassis 26 is now completely provided with a cover 29.

Figure 4:
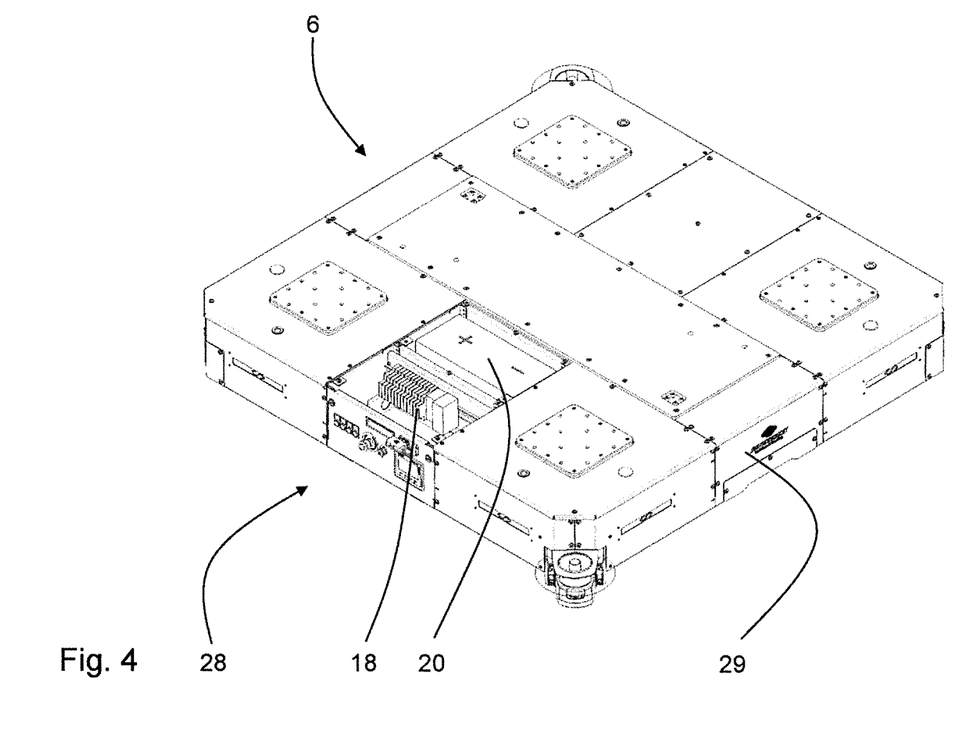

One of the slide-in slots 28 (shown open) is fitted with an energy storage unit 20 and a detecting device 18 as an interchangeable combination.

Figure 5:
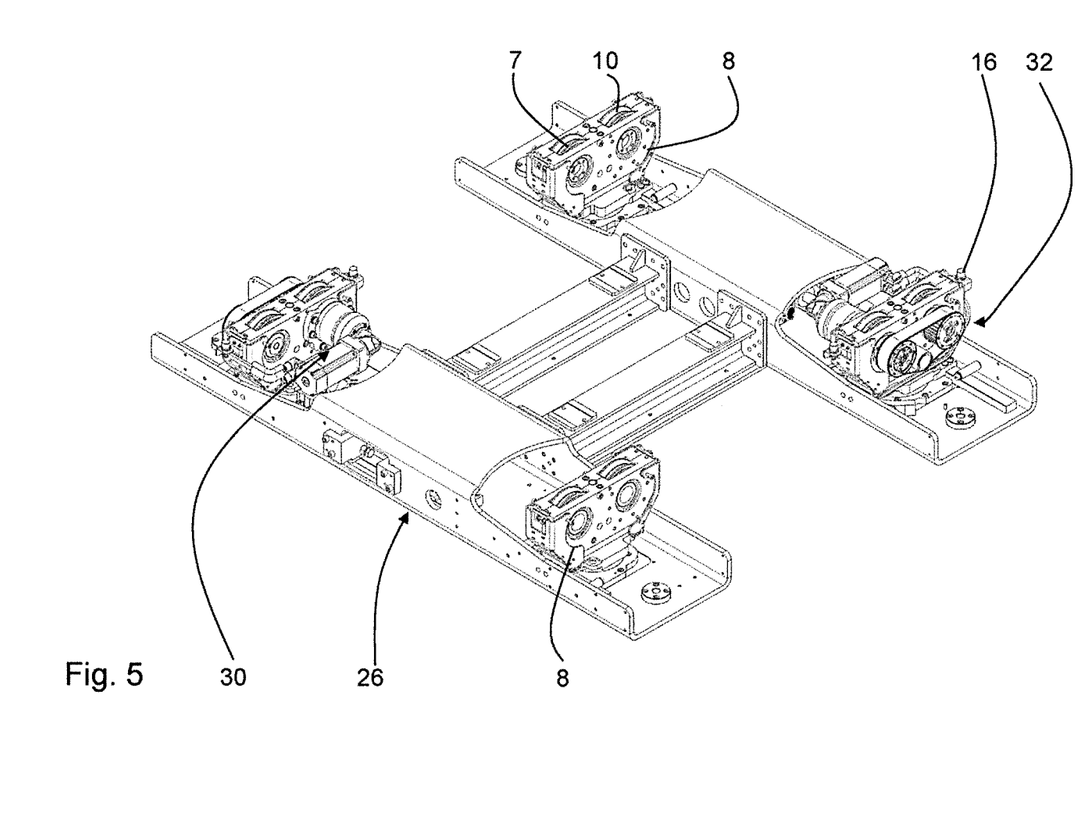

FIG. 5 shows the chassis 26 of the floor conveyor 6 from the underside. In this manner, the wheel cassette 8 with its two wheels 7 is significantly clearer. The peripheral contour 10 of the wheel 7 is also visible. In the embodiment example, this is a concave indentation over the entire circumference, wherein the concave shape is adapted to the convex shape of a rail 11. As long as the floor conveyor 6 is guided on the rails 11, the wheel thus partially encloses the round rail and can also absorb lateral loads. As soon as the wheel 7 drives upon a support plate 5, it is no longer guided laterally. This was previously thought to be a necessity, but with the advantage of more reliable functionality, it has been shown that the static friction of the wheel, which is to say, in particular of the two overlying flanks next to the concave indentation, on the now flat and smooth support plates is sufficient to enable the execution of the targeted rotation of the wheel in the direction of the intersecting rail.

On the wheel cassette 8, a sensor 16 is also indicated in FIG. 5, which sensor can, for example, inductively determine the position of the wheel cassette 8 on a support plate 5. As soon as the axis of rotation 9 of the wheel cassette 8 and the axis of rotation 22 of the support plate 5 are aligned, a detecting device 18 can transmit a signal to a control unit 19, which then allows the rotary drive of the wheel cassette to be activated. The latter features can no longer be shown in FIG. 6 and must be considered in conjunction with other figures.

Figure 7:
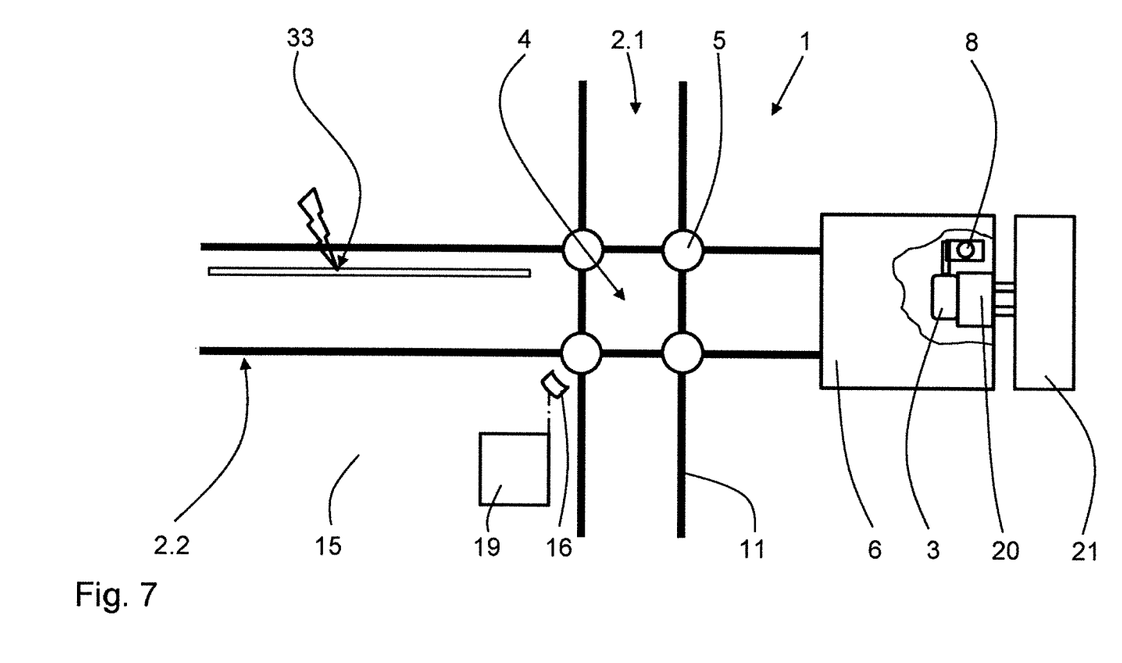

Finally, FIG. 7 shows a rough schematic representation of an intersection region 4, configured by the rail pairs 2.1 and 2.2, and corresponding four rotatable support plates 5, on which the wheel cassettes 8 can execute their direction change.

A cut-open floor conveyor 6 is shown, which is parked next to a charging station 21 and there can supply its energy storage unit 20 with electricity. The wheel-cassette rotary drive assembly 3 and the motor of the traction drive arrangement 31 can be operated with the charged energy. As an alternative or in addition to the charging station, it would also be conceivable to charge the energy storage unit 20 along the rail sections by means of an inductive or sliding contact charging unit 33.

REFERENCE SIGN LIST

1 Rail-type floor conveyor system
2.1, 2.2 Rail pair
3 Wheel-cassette rotary drive assembly
4 Intersection region
5 Support plates
6 Floor conveyor
7 Wheel
8 Wheel cassette
9 Axis of rotation of wheel cassette
10 Peripheral contour of the wheel
11 Rail
12.1, 12.2 Running direction
14 Flat surface
15 Production hall floor
16 Sensor
17 Rotary drive assembly motor
18 Detecting device
19 Control unit
20 Energy storage unit
21 Charging station 22 Axis of rotation of support plates
23 Push rod
24 Lever
25 Toothed belt
26 Chassis
27 Bearing or supporting surfaces
28 Slide-in slot
29 Cover
30 Traction drive arrangement
31 Motor of the traction drive arrangement
32 Wheel synchronization unit
33 Inductive or sliding contact charging unit

What is claimed is:

1. A rail-type floor conveyor system for a floor conveyor, comprising:
   at least two rail pairs, of different running directions, which run toward each other,
   at least four rotatably mounted support plates on bearings, which are located in an intersection region of two said rail pairs,
   at least one floor conveyor having at least four wheel cassettes, each of which is adapted to be rotated about a vertical axis and which each have at least one wheel in contact with the rails, wherein the wheels of a floor conveyor are adapted to be rotated from a first running direction into a second running direction on the support plates, and each wheel has a peripheral contour which is complementary to at least one profile of a rail of a said rail pair, so that transverse forces on the floor conveyor are adapted to be absorbed by the rail pair, and
   a wheel-cassette rotary drive assembly connected to the floor conveyor and adapted to rotate the wheel cassettes about their vertical axis on the support plates,
   wherein the support plates have no profiling suitable for guiding the wheels.

2. A rail-type floor conveyor system according to claim 1, wherein the support plates each have a flat surface.

3. A rail-type floor conveyor system according to claim 2, wherein a coefficient of friction for static friction of more than 0.07, is present between an outer circumference of each wheel and the flat surface of a respective said support plate.

4. A rail-type floor conveyor system according to claim 1, further comprising at least one sensor for detecting one of:
   the position of a floor conveyor in the intersection region or
   the position of a wheel on a support plate.

5. A rail-type floor conveyor system according to claim 4, further comprising:
   a motor of the wheel-cassette rotary drive assembly, and
   at least one detecting device coupled to the sensor,
   wherein the motor of the wheel-cassette rotary drive assembly is adapted to be activated when the at least one detecting device has transmitted a signal to a control unit.

6. A rail-type floor conveyor system according to claim 1, wherein at least two said wheel cassettes are adapted to be rotated synchronously by the wheel-cassette rotary drive assembly.

7. A rail-type floor conveyor system according to claim 1, wherein the wheel-cassette rotary drive assembly comprises:
   a drive with one of a traction element or pressure element,
   a motor for moving said one of said traction element or pressure element and
   a lever on at least one wheel cassette which connects to the one of said traction element or pressure element.

8. A rail-type floor conveyor system according to claim 1, wherein the floor conveyor has a traction drive arrangement acting on at least one wheel of a said wheel cassette.

9. A rail-type floor conveyor system according to claim 8, wherein a driving force is adapted to be synchronized by rotation of all wheels of a wheel cassette.

10. A rail-type floor conveyor system according to claim 8, further comprising a rechargeable energy storage unit on the floor conveyor for supplying energy to one of:
    the wheel-cassette rotary drive assembly,
    the traction drive arrangement or
    both the wheel-cassette rotary drive assembly and the traction drive arrangement.

11. A rail-type floor conveyor system according to claim 10, wherein the energy storage unit is adapted to be charged in a charging station for the floor conveyor.

12. A rail-type floor conveyor system according to claim 10, wherein the energy storage unit is adapted to be charged inductively along the travel path on the rail pairs.

13. A method for operating a rail-type floor conveyor system according to claim 1 during a direction change of a floor conveyor, within an intersection region, from a first rail pair to an intersecting second rail pair with the aid of rotation of wheel cassettes, which are mounted on bearings on the floor conveyor about an axis of rotation, by a wheel-cassette rotary drive assembly, comprising the steps of:
    synchronously rotating at least one support plate, which is unprofiled on its surface, by friction of a wheel due to the rotation of the wheel cassette about a vertical axis.

14. A method according to claim 13, wherein as a pairing between an outer circumference of the wheel and the surface of the support plate, there is a coefficient of friction for static friction of more than 0.07.

15. A method according to claim 13, further comprising the step of moving the floor conveyor into and away from the intersection region by a traction drive arrangement connected to the floor conveyor acting on at least one wheel of a wheel cassette.

16. A rail-type floor conveyor system according to claim 3, wherein a coefficient of friction for static friction of more than 0.13 is present between an outer circumference of each wheel and the flat surface of a respective said support plate.

17. A method according to claim 13, wherein as a pairing between an outer circumference of the wheel and the surface of the support plate, there is a coefficient of friction for static friction of more than 0.13.

* * * * *